United States Patent [19]

Kinosz et al.

[11] 4,083,943
[45] Apr. 11, 1978

[54] PRODUCTION OF MAGNESIUM CHLORIDE

[75] Inventors: Donald L. Kinosz, Lower Burrell; Warren E. Haupin, New Kensington, both of Pa.

[73] Assignee: Aluminum Company of America, Pittsburgh, Pa.

[21] Appl. No.: 750,561

[22] Filed: Dec. 14, 1976

[51] Int. Cl.$^2$ .......................... C01F 5/32; C25C 3/04
[52] U.S. Cl. ............................... 423/498; 23/277 R; 204/70
[58] Field of Search .......... 423/498; 23/277 R, 252 A

[56] References Cited

U.S. PATENT DOCUMENTS

| | | | |
|---|---|---|---|
| 2,214,612 | 9/1940 | Greenberg | 23/252 A X |
| 2,384,479 | 9/1945 | Lepsoe et al. | 423/498 X |
| 3,639,101 | 2/1972 | Washburn | 106/44 X |
| 3,953,574 | 4/1976 | Toomey | 423/498 X |

FOREIGN PATENT DOCUMENTS 886,212  1/1962  United Kingdom ................ 423/498

*Primary Examiner*—Edward Stern
*Attorney, Agent, or Firm*—Andrew Alexander

[57] ABSTRACT

A molten mixture containing magnesium oxide, magnesium chloride and a reducing agent is chlorinated in a furnace having a refractory lining, at least a portion of which adjacent the surface of the molten mixture therein is formed from a nitride-based refractory.

4 Claims, 2 Drawing Figures

PRODUCTION OF MAGNESIUM CHLORIDE

BACKGROUND OF THE INVENTION

This invention relates to the production of magnesium chloride. More particularly it relates to the production of magnesium chloride utilizing a refractory liner highly resistant to deterioration by reactants in the process.

It is known to produce magnesium chloride by the chlorination of magnesium oxide or an impure mixture of magnesium chloride and magnesium oxide by chlorinating the oxide in the presence of a reducing agent such as carbon or the like. For example, British patent specification No. 886,212 teaches the chlorination of a mixture of magnesium chloride and magnesium oxide by chlorinating a molten mixture of magnesium oxide and magnesium chloride while passing the materials through a carbonaceous material such as lump coal or coke or the like. However, such processes are normally carried out at elevated temperatures, for example the aforesaid British Patent mentions the temperature of the chlorinator as 750° to 900° C. At this temperature, problems can arise with respect to the types of materials, particularly refractories, used in the apparatus from the standpoint of purity of the magnesium chloride and magnesium produced therefrom. Also, serious problems can arise if the refractories used are not resistant to attack by molten magnesium chloride in the chlorinator, for example, or gases emanating therefrom such as chlorine, phosgene, carbontetrachloride and boron trichloride. For example, British patent specification No. 149,670 describes a process for producing magnesium chloride using carbon tetrachloride, oxychloride of carbon or phosgene, i.e., using carbonated chloride to provide a reaction temperature of about 500° to 600° C. The patentee states the low reaction temperature of 500° to 600° C brings the advantage that the question regarding the apparatus is not difficult to solve. However, because of advantages of operating at the higher temperature, it is desirable to provide a system wherein magnesium chloride could be formed by the chlorination of magnesium oxide with chlorine in the presence of a reducing agent wherein the reaction vessel is substantially impervious to attack from the reactants. Similarly, it is desirable to provide also a refractory for use in an electroyltic cell for the decomposition of the magnesium chloride to form magnesium which is resistant to attack by the electrolyte, molten magnesium and gases evolved during the decomposition process. Having a refractory resistant to attack avoids frequent shutdown of the cell for repair purposes and prevents contamination of the magnesium produced.

SUMMARY OF THE INVENTION

In accordance with the invention, a furnace is provided for the production of magnesium chloride in a molten mixture containing mainly magnesium oxide in a magnesium chloride melt to which is added a source of chlorine to convert magnesium oxide to magnesium chloride. The furnace comprises a chamber for holding the molten mixture, the chamber having a refractory lining, at least a portion of the lining adjacent the surface of the molten mixture comprising a nitride-based refractory. In a preferred embodiment, the chamber can have a conduit projecting through the surface of the molten mixture for introducing the chlorine thereto. At least the part of the conduit adjacent the surface of the molten mixture should comprise a nitride-based refractory.

An electrolytic cell is provided in which magnesium is produced from the electrolytic decomposition of magnesium chloride contained in a molten salt electrolyte. Magnesium is produced at the cathode and floats to the surface of the electrolyte and chlorine is produced at the anode. A shroud or wall projects into the molten electrolyte such that the chlorine produced at the anode is prevented from contacting the molten magnesium layer, the shroud formed from a nitridebased refractory material resistant to the molten magnesium, electrolyte and gases emanating therefrom. In a preferred embodiment, the shroud surrounds the anode projecting into the electrolyte, preventing both the chlorine coming in contact with the molten magnesium and the resultant formation of magnesium chloride and preventing the magnesium layer contacting the anode and short-circuiting the cell.

DETAILED DESCRIPTION OF THE PREFERRED EMBODIMENTS

Figure 1:
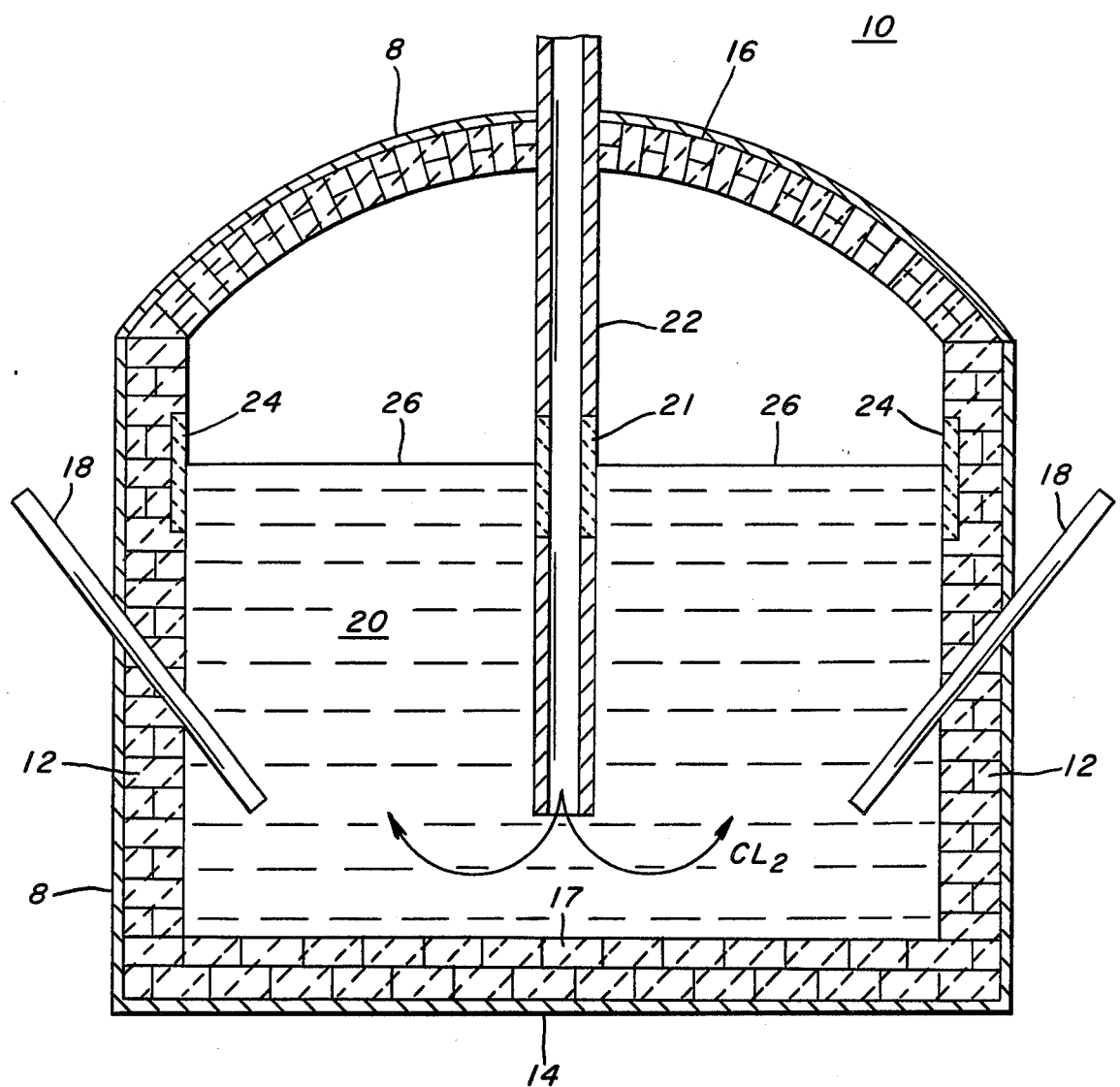
FIG. 1 illustrates in cross section a form of magnesium chloride production furnace incorporating principles of the invention.
Figure 2:
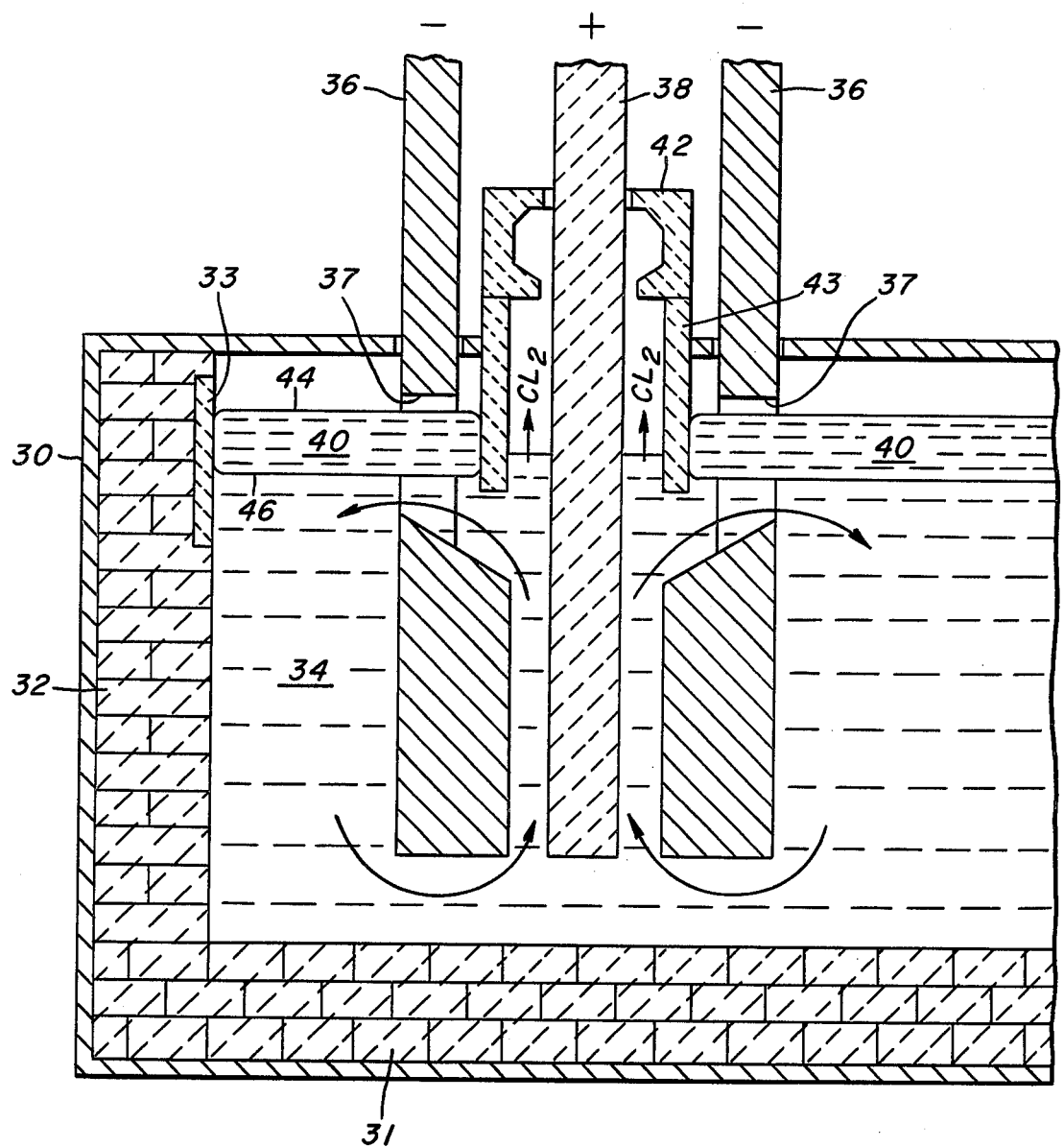
FIG. 2 illustrates in cross section a form of electrolytic cell for the production of magnesium from magnesium chloride incorporating principles of the invention.

To inhibit attack of refractory materials by reactants in the production of magnesium, the present invention utilizes a nitride-based refractory material in a magnesium chloride production furnace (FIG. 1) and in an electrolytic cell for the production of magnesium from magnesium chloride (FIG. 2). The use of a nitride-based refractory at selected locations significantly increases the useful life of the furnace and cell as well as reducing contamination of the magnesium produced.

The nitride-based material or refractory referred to includes both a refractory having a nitride base or a refractory having associated therewith a compound such as silicon oxide (silica), boron oxide and aluminum oxide. Preferred materials using the nitride-based refractory in accordance with this invention include silicon oxynitride, silicon nitride bonded fused silica, silicon nitride, and boron nitride. In these preferred compounds, the nitrogen content of the refractory should be between 25 and 60 wt.% of the nitride. Silicon oxynitride referred to can be prepared, for example, in accordance with the procedures disclosed by Washburn in U.S. Pat. Nos. 3,350,513; 3,639,101 and 3,679,444, incorporated herein by reference. Such silicon oxynitride is commercially available from Norton Company, Worcester, Massachusetts and is referred to as SI-OXYN. It has the general formula $Si_2ON_2$.

An important aspect of the refractory is that it should be substantially free of carbon bearing material or compounds which can react with or contaminate the end product. The presence of carbon in the form of silicon carbide, for example, in the refractory can detrimentally lower the refractory's resistance to attack by materials in the furnace or the cell. That is, it is believed that the presence of carbon or carbon compounds, e.g. silicon carbide, results in discontinuity in the refractory and permits attack of the refractory by the molten materials in the furnace or cell and the gases emanating therefrom. Cracks and flaws and consequently deterioration of the refractory and contamination of the magnesium chloride and magnesium cna result. Thus, in the preparation of the nitride-based material, a green binder should be selected which leaves substantially no carbonaceous residue such as carbon or carbon compounds, e.g. silicon carbide, on forming the refractory. For example, in the production of silicon oxynitride refractory from silica, silicon and nitrogen, the use of an acrylic resin binder such as methacrylate, ethacrylate, butylacrylate or methylmethacrylate, ethylmethacrylate and butylmethacrylate, or combinations of these, can result in substantially no carbonaceous residue or compounds, e.g. silicon carbide, on firing which can later permit attack of the refractory and resulting deterioration of the refractory and subsequent contamination of the end product.

Magnesium chloride can be prepared by bubbling or passing chlorine gas through a molten bath of magnesium chloride containing magnesium oxide and reducing agent. Impurities present in the magnesium oxide can be removed by being converted to their chlorides. For example, boron oxide, often present as an impurity, is converted to boron trichloride which emanates from the melt as a vapor and is thus separated from the magnesium chloride. In addition, any water or hydrogen bearing compound form hydrogen chloride which also emanates from the melt. In the production of magnesium chloride in this manner, the melt is kept above the melting point of magnesium chloride (712° C) and preferably at a temperature in the range of 750° to 1000° C. It is these high temperatures along with highly corrosive gases such as chlorine, hydrogen chloride, boron trichloride and molten magnesium chloride which are extremely difficult to contain and which cause deterioration of conventional refractories used in the production of magnesium chloride and magnesium.

By reference to FIG. 1, there is shown a furnace, generally referred to as 10, wherein magnesium chloride is formed from magnesium oxide substantially as indicated immediately above. The cell comprises a metal shell 8 which is lined on sides 12, bottom 14 and top 16 with a refractory material, for example, substantially as shown. Magnesium chloride containing magnesium oxide provided in the furnace is heated by means of heating electrodes 18 utilizing alternating current. That is, melt 20 is heated by virtue of its resistance to the alternating current. Preferably, heating electrodes are formed from a carbonaceous material, e.g. graphite. In a preferred embodiment, chlorine is introduced to melt 20 through conduit 22 which projects through top 16. The chlorine reacts in the presence of a reducing agent to form the aforementioned magnesium chloride. The volatile chlorides emanating from the melt 10, e.g. boron trichloride and hydrogen chloride, are removed from cell 10 by any suitable means (not shown) well known to those skilled in the art. In accordance with the present invention, certain selected portions of cell 10 are constructed using the aforementioned nitride-based refractory. Thus, the sides 12 are lined or bounded at least in part with a portion or band 24 of nitride-based refractory substantially as shown in FIG. 1. The band of refractory material should be positioned such that part of it projects above and below surface 26 of the melt. If the sides are lined only in part with the nitride-based refractory, the refractory employed to complete the lining of sides 12, 14 and 16 can be a refractory material such as alumina-silica brick or fused cast alumina brick 17. In addition, at least portion 21 of conduit 22 adjacent surface 26 of the melt 20 should be constructed from the nitride-based refractory. That is, the portion of the conduit constructed of the nitride-based refractory should extend above and below surface 26 of the melt 20. A furnace constructed using the nitride based refractory in this manner, instead of having a life of only a few months can have a useful life of as much as a few years.

In FIG. 2, there is shown an electrolytic cell suitable for the production of magnesium from magnesium chloride. The cell has an outer metal shell 30 and a refractory liner referred to generally as 32. An electrolyte 34 containing magnesium chloride is provided in the cell. The electrolyte as well as containing magnesium chloride preferably contains at least one metal chloride selected from the group consisting of sodium, potassium, lithium, calcium and barium chloride. Metal cathodes 36 are immersed in the electrolyte. The cathodes have openings 37 therein for circulation of the electrolyte. Preferably the metal employed in the cathodes is steel. A graphite anode 38 is preferably located between cathodes 36. When an electrical current is passed between the anode and cathodes, magnesium chloride is decomposed and chlorine gas is evolved at the anode and magnesium is produced at the cathode. The magnesium forms a floating layer 40 on the molten electrolyte substantially as shown in FIG. 2. Because chlorine gas produced at the anode would react with the magnesium, a housing 42 is mounted on the cell so that a skirt portion 43 attached thereto projects downwardly into the magnesium chloride to remove the chlorine. At least skirt portion 43 is formed from the nitride-based refractory. Preferably the complete housing 42 is formed from the nitride-based refractory. In a preferred embodiment, housing 42 and skirt portion 43 surrounds anode 38 as shown in FIG. 2. Skirt portion 43 prevents the chlorine gas from contacting the magnesium and forming magnesium chloride. In addition, in the embodiment shown in FIG. 2, skirt portion 43 prevents molten magnesium 40 from contacting graphite 38 and shortcircuiting the cell.

In operation of the electrolytic cell, the electrolyte is normally kept at a temperature above the melting point of magnesium and typically at a temperature in the range of 750° to 850° C. Because of the high temperatures employed, the corrosive gases such as chlorine emanating from the cell and the molten magnesium, conventional refractories such as silica-based refractories are subject to deterioration. Thus, nitride-based refractory must be utilized for construction of at least skirt portion 43 to ensure against frequent shutdown of the cell and costly repair work.

Cell structures or configuration other than that shown in FIG. 2 can be used in the electrolytic production of magnesium from magnesium chloride wherein a skirt portion or conduit is used to remove chlorine gas evolved at the anode without the chlorine gas coming in contact with the molten magnesium layer. That is, anode 38 may be projected into the cell through bottom 31 and skirt portion 43 extended downwardly in the cell to collect gas evolved at the anode. In this way, the chlorine gas evolved can be removed without reacting the molten magnesium.

Another preferred aspect of the invention which can aid in extending the useful life of the cell resides in providing the nitride-based refractory at selected locations in the liner. Thus, at least a portion 33 of liner 32 can comprise a nitride-based refractory and should extend above and below surface 44 of magnesium layer 40. Preferably, portion 33 should extend below level 46, the interface between magnesium layer 40 and electrolyte 34. When just a portion 33 of the nitride-based refractory is used, the remainder of liner 32 can comprise alumina-silica or fused cast alumina brick placed substantially as shown in FIG. 2 to complete lining 32.

While the inventors do not necessarily wish to be held to any theory of invention, it is believed that important areas in the furnace and cell disclosed in FIGS. 1 and 2 at which the nitride-based refractory should be used include regions which extend above and below the gas-liquid interface. This region of the refractory is important because of complicated chemical activity at the gas-liquid interface which is not clearly understood but which has a highly deleterious effect on conventional type refractories used in the production of magnesium and magnesium chloride.

Thus, the invention envisions a furnace for the production of magnesium chloride from a melt containing magnesium oxide, magnesium chloride and a reducing agent to which chlorine gas is added to convert the magnesium oxide to magnesium chloride. The magnesium chloride production cell having a lining, at least a portion of which is adjacent the surface of the melt, i.e. extending above and below the surface of the melt, comprising a nitride-based refractory resistive to attack by the melt and gases emanating therefrom. The invention further contemplates an electrolytic cell for the production of magnesium from magnesium chloride wherein magnesium is produced at a cathode and chlorine gas at an anode, the cell having a housing with a skirt portion or conduit attached thereto to remove chlorine gas evolved without reacting with the magnesium produced, at least the skirt portion or conduit being formed from a nitride-based refractory resistant to attack by chlorine gas, molten magnesium and molten bath containing the magnesium chloride. Providing the nitride-based refractory at selected regions as indicated above, for example, and particularly in regions adjacent the melt surface, i.e. extending above and below the surface can extend the useful life of the magnesium chloride production cell or the magnesium production cell rather significantly. That is, by use of a nitride-based refractory at selected regions, the life of the cells can reach as much as a few years which is a significant improvement over conventional refractory materials, e.g. fused cast alumina, whose useful life can be as short as a few months under similar conditions.

While the invention has been described in terms of preferred embodiments, the claims appended hereto are intended to encompass all embodiments which fall within the spirit of the invention.

Having thus described the invention and certain embodiments thereof, we claim:

1. An improved process for the production of magnesium chloride from a molten mixture containing magnesium oxide, magnesium chloride and a reducing agent, comprising chlorinating the magnesium oxide in a chamber for holding the molten mixture, the chamber employing a refractory lining, at least a portion thereof adjacent the molten mixture surface formed from a nitride-based refractory selected from the group consisting of silicon oxynitride, silicon nitride bonded fused silica, silicon nitride and boron nitride, the refractory characterized by being essentially free of carbonaceous residue and being resistant to attack by the mixture and gases emanating therefrom.

2. The process according to claim 1 including introducing chlorine through a conduit projecting through the surface of said mixture, at least a portion of said conduit formed from said nitride-based refractory.

3. The process according to claim 2 wherein the nitride-based refractory employed is silicon oxynitride.

4. An improved process for the production of magnesium chloride from a molten mixture containing magnesium oxide, magnesium chloride and a reducing agent comprising:
 (a) providing said molten mixture in a chamber employing a refractory lining; and
 (b) introducing chlorine through a conduit to the mixture, both the refractory lining and the conduit having at least a portion thereof adjacent the molten mixture surface formed from silicon oxynitride characterized by being substantially free of carbonaceous material and being resistant to attack by the mixture and gases emanating therefrom.

* * * * *